United States Patent [19]

Jepsky et al.

[11] 4,117,482
[45] Sep. 26, 1978

[54] METHOD AND APPARATUS FOR LOCATING POSITION IN A WATERWAY

[75] Inventors: Joseph Jepsky, Marblehead; Irvin S. Englander, Cambridge, both of Mass.; James E. Williams, Pelham, N.H.

[73] Assignee: Associated Controls & Communications, Inc., Lynn, Mass.

[21] Appl. No.: 813,481

[22] Filed: Jul. 7, 1977

[51] Int. Cl.² .............................................. G01S 9/04
[52] U.S. Cl. ........................................ 343/7.3; 343/15; 343/112 R
[58] Field of Search ............. 343/112 R, 112 C, 18 B, 343/5 MM, 7.4, 15, 7.3, 5 DP

[56] References Cited

U.S. PATENT DOCUMENTS

| | | | |
|---|---|---|---|
| 3,181,146 | 4/1965 | Huckabay et al. | 343/15 |
| 3,181,155 | 4/1965 | Huckabay et al. | 343/15 |
| 3,270,345 | 8/1966 | Schauffler | 343/112 R |
| 3,289,207 | 11/1966 | Lent | 343/112 R |
| 3,422,427 | 1/1969 | Schauffler | 343/112 R |

Primary Examiner—Richard A. Farley
Assistant Examiner—Lawrence Goodwin
Attorney, Agent, or Firm—Thomas N. Tarrant

[57] ABSTRACT

An electromagnetic energy pulse-echo system combined with a data processing unit and a memory storing the locations of a number of fixed echo reflectors relative to a waterway so that the pulse-echo system operating from a boat can register the echo reflectors and positions in the waterway can be calculated by the data processing unit.

4 Claims, 4 Drawing Figures

METHOD AND APPARATUS FOR LOCATING POSITION IN A WATERWAY

BACKGROUND OF THE INVENTION

1. Field of the Invention

The present invention relates to computer-aided navigation systems but more particularly to such a system operated from a boat to determine positions in a waterway whether for navigation, dredging, setting of buoys or the like.

2. Description of the Prior Art

Ocean and air navigation has been implemented over the years by a variety of sophisticated radio and radar equipment. Doppler navigation systems using computers will give continuous readings of distances from starting point and to destination as well as present location in latitude and longitude, speed, bearing to destination, side drift and other data of interest. However, in inland waterways and narrow dredged channels positional accuracy must frequently be plus or minus a few feet. Buoys are frequently misplaced or are forced out of position. Channels are not always dredged exactly as indicated on the charts. The equipment and devices used for positional finding in buoy maintenance and dredging varies widely in character and accuracy. Both radar and laser range finding equipment is used as well as traditional surveying devices. Because such waterways are so beset with navigational hazards, larger vessels customarily employ special pilots with continuous familiarity with the waterways being used.

SUMMARY OF THE INVENTION

Now, in accordance with the present invention, a system for locating position in a waterway is provided that retains a high degree of accuracy. Reflectors are permanently positioned along the sides of the waterways of interest and data representing the waterway channels and positions of the reflectors is stored in a data processing storage unit. The inventive apparatus is an on-board radar-computer combination that detects the reflectors positioned along the waterway and calculates position from the stored information and the detected reflector positions. A display console displays position from channel centerline, distance from next turn in channel, and speed.

Thus it is an object of the invention to provide a novel system for position locating in a waterway.

Further objects and features of the invention will become apparent upon reading the following description together with the drawing.

DESCRIPTION OF THE PREFERRED EMBODIMENT

The preferred embodiment of the invention will be described in terms of a navigational system and its use for buoy maintenance and dredging will then be described in further detail. For navigating in restricted waterways, it is important to know such things as speed, distance from the center of the channel, azimuth angle relative to the center of the channel, and distance to the next turning point. The present system provides all of this information.

Part of the present system is an installation of radar reflectors along the waterways of interest. These radar reflectors are suitably installed in pairs or triads. For simplicity, the following description assumes reflectors in pairs. The spacings of the pairs are not critical, but in places where there would be a lot of interfering noise (radar clutter) or where a high degree of accuracy is important, the maximum range to the reflectors should be reduced as required. In uncluttered areas with wide straight channels the range can be extended. The spacing distances that have been useed between pairs of reflectors has been ½ to 10 miles. The spacing between reflectors in a set affects the accuracy of indications relative to channel centerline. With two reflectors, a separation of one unit for each five units of channel length is a good rule-of-thumb. Accuracy decreases with decreasing separation. The radar must have a narrow horizontal beam width preferably less than 2°. The radar reflectors should be designed to maintain the reflected beam as narrow as possible. Trihedral corner reflectors are suitable.

In the presently preferred configuration, each waterway of interest is broken into straight line segments hereinafter called "channels" with a pair of reflectors bracketing each channel.

The geometry of each channel is then stored in a memory. The stored geometry includes:

1. The distances along a line connecting the pair of reflectors from each reflector to the centerline of the channel.

2. The angle between the above line and a perpendicular to the channel centerline at the intersection of the two.

3. The length of the channel.

Configurations are contemplated in which a pair of reflectors can be used for more than a single straight line segment. These contemplated configurations increase the quantity and complexity of the information to be stored for each channel and require a substantial increase in data processing complexity. Nevertheless, these are all within the present skill of the data processing art and considered as included within the present invention.

Figure 1:
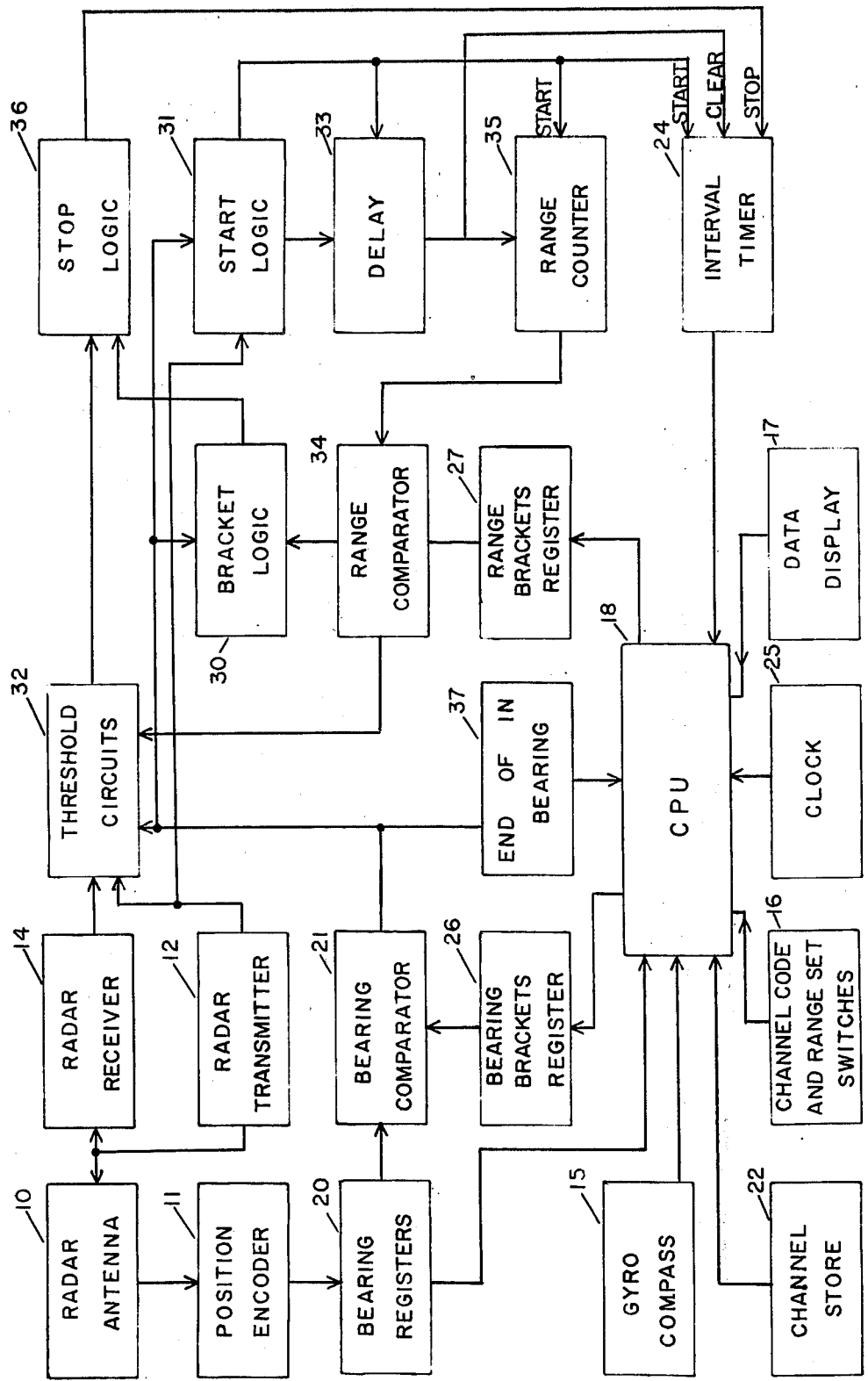
FIG. 1 is a block diagram of position locating apparatus according to the invention.

The on-board apparatus is depicted by the block diagram of FIG. 1. This apparatus includes a radar set, a data processing system, a compass and a control console. Referring to FIG. 1, the radar set includes radar antenna 10, a position encoder 11, radar transmitter 12 and radar receiver 14. Compass 15 is the usual shipboard gyro compass. The control console includes channel code and range set switches 16 and display 17. The data processing system includes CPU (central processing unit) 18 and a number of peripheral units.

Position encoder 11 provides a digital code of the antenna position accurate to 10 minutes of arc. This is suitably accomplished with a combination of single and 36 speed synchros together with synchro-to-digital converters. A number of other suitable position encoding devices are known to the art. The output of encoder 11 is connected to bearing registers 20. Bearing Registers 20 are connected to CPU 18 and to Bearing Comparator 21. Bearing Registers 20 indicate antenna position relative to the vessel and are not corrected for compass bearing. Thus Gyro Compass 15 is connected to CPU 18 for compass bearing. Gyro Compass 15 includes synchros and synchro-to-digital converters for interfacing with CPU 18. Other types of bearing encoding means can be used to interface with CPU 18.

Other inputs to CPU include Channel Code and Range Set Switches 16, Channel Store 22, Interval Timer 24 and Clock 25.

Channel Code and Range Set Switches 16 provide address information that is used by CPU 18 to index Channel Store 22. Switches 16 are suitably rotary selector switches provided with logic networks connected to provide binary codes at the input to CPU 18.

Channel Store 22 is suitably an integrated circuit read only memory or some form of magnetic memory. In a preferred arrangement there are two stationary reflectors for each numbered channel which may be located one on each side of the channel or both on the same side. (see FIG. 4) Channel Store 22 contains for each channel, parameters specifying the locations of each reflector relative to the channel center-line along a straight line intersecting the two reflectors.

Interval Timer 24 is a resettable timer that counts the time between a radar pulse and the received echo. Timer 24 receives a Start pulse with every radar pulse generated within the predetermined bearings and receives a Stop pulse within the predetermined range derived from the radar receiver receiving the respective echo. A Clear pulse is generated beyond the time in which a desired echo would be received. Interval Timer 24 provides range data to CPU 18.

Clock 25 is a precision clock pulse generator that provides the basic timing pulse for the system allowing range and speed to be calculated.

CPU 18 provides outputs to Channel Store 22, Data Display 17, Bearing Brackets Register 26 and Range Brackets Register 27. The output to Channel Store 22 is for indexing (addressing) purposes as has been described.

Figure 2:
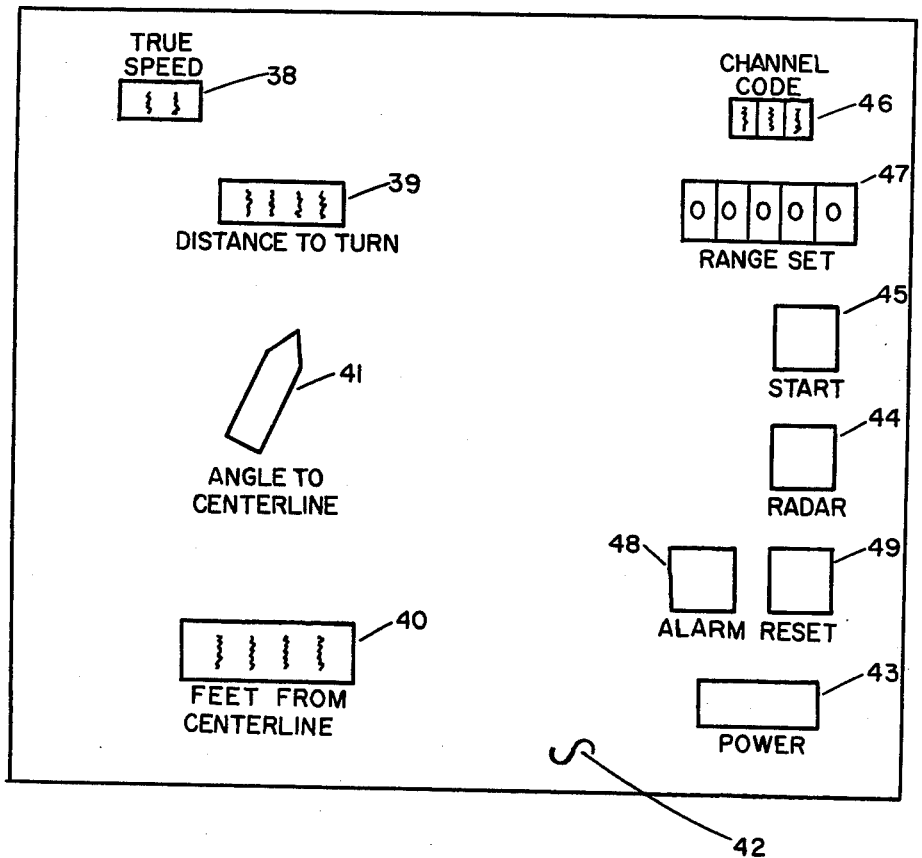
FIG. 2 is a front elevation of the control console in the apparatus of FIG. 1.

Data display 17, part of the Control Console illustrated in FIG. 2, includes, register 38 showing speed in knots, register 39 showing distance to turn in feet and register 40 showing distance to channel centerline in feet. Device 41 depicting angle to centerline by simulation has also been included. Alarm 48 on the display panel is triggered by loss of echos or inconsistent echos.

Bearing Brackets Register 26 is simply a register used by CPU 18 for storing bearing brackets that are used repeatedly. The bearing brackets are originally generated by CPU 18 from data obtained from Bearing Register 20, Compass 15, Channel Store 22 and range information from Timer 24. Bearing Brackets Register 26 sets the bearing limits within which each reflector must be found.

Similarly, Range Brackets Register 27 is a register used for storing range brackets. Range Brackets are generated in a similar fashion to bearing brackets and set the range limits within which each reflector must be found.

Bearing Brackets Register 26 is suitably made up of two registers one of which stores the smallest bearing angle at which a given reflector might be located, a second of which stores the largest angle at which said reflector might be located.

The output of Bearing Brackets Register 26 is connected to Bearing Comparator 21 which also has an input from Bearing Registers 20. Comparator 21 Compares the bearings registered in Register 26 with the bearing registered in Register 20 and generates an enabling gate when the bearing of register 20 is within the bracket set registered in Register 26. The trailing edge of the enabling gate is used to request CPU 18 to provide the other brackets for both registers 26 and 27. Each of In Bearing 37 connects the output of comparator 21 to CPU 18. The enabling gate enables Bracket Logic 30, Start Logic 31 and Threshold Circuits 32.

One way of implementing Comparator 21 is to use two digital comparators each having one input connected to register 20. The first comparator has its second input connected to the register (of Register 26) carrying the smaller bearing angle. The second Comparator has its second input connected to the register (of Register 26) carrying the larger bearing angle. When the first comparator detects a match, a flip-flop is set. When the second comparator detects a match, the flip-flop is reset. The flip-flop output is a gate acting as an enable signal when set and as an inhibit signal when reset.

The trigger output of Radar Transmitter 12 is connected to, threshold circuits 32 and Start Logic 31.

The output of Range Brackets Register 27 is connected to Range Comparator 34 which also has an input from Range Counter 35. Range Brackets Register 27, like Bearing Brackets Register 26, is suitably made up of two registers storing the smallest and largest possible ranges for a given reflector. Range Counter 35 counts the range as a function of time after each radar pulse transmitted while in bearing.

Range Comparator 34 compares the ranges registered in Register 27 with the range registered by Range Counter 35 and generates an enabling gate when the range of Counter 35 is within the bracket specified by Register 27. Range Comparator 34 may be implemented the same way as Bearing Comparator 21.

The output of Range Comparator 34 is connected as inputs to Bracket Logic 30 and Threshold Circuits 32.

Bracket Logic 30 serves an AND function to enable Stop Logic 36 only while within both bearing and range brackets.

The output of Radar Receiver 14 is connected to Threshold Circuits 32. The purpose of Threshold Circuits 32 is to normalize the point on a received echo that will trigger Stop Logic 36.

One approach is to employ a constant-fraction-of-pulse-height-discriminator to establish that point on the pulse at which the measurement is to be made. The constant-fraction-of pulse-height-discriminator establishes the measured point at the same percentage of pulse height regardless of the amplitude of the pulse, and is used to compensate for the anticipated variations in return pulse amplitudes encountered in radar applications.

Stop Logic 36 serves an AND function to provide a Stop signal to Timer 24 on an echo signal from Circuits 32 only in the presence of an enabling gate from Bracket Logic 30.

Start Logic 31 provides an AND function passing radar triggers only during the enabling gate from Comparator 21. The output of Start Logic 31 is connected to Delay 33, Range Counter 35 and Timer 24.

On a radar trigger pulse inside the bearing brackets, the output of Start Logic 31 begins a timing interval in Delay 33 and range counts in both Counter 35 and Timer 24. Delay 33 is a timing circuit that provides a CLEAR pulse after the timed delay interval. A fixed delay interval is predetermined longer that the time for a radar pulse to travel to the anticipated farthest target and back. This insures that Timer 24 will not be cleared until after a Stop signal from Logic 36. Delay 33 is connected to Range Counter 35 and Timer 24 at their clear inputs.

FIG. 2 depicts a display console having a True Speed Indicator 38, Distance-to-Turn display register 39, Feet-from-Centerline display register 40, Angle-to-Centerline Display 41 and operating controls 42. Controls 42 include Power Switch 43, Radar Start Switch 44, Navigation System Start Switch 45, Channel Code Set Switches 46 and Range Set Switches 47. Alarm Light 48 is located beside Alarm Reset Switch 49.

Display registers are suitably of the self-illuminating type such as gas plasma segmented digital characters interfaced from CPU 18 with binary to decimal converters. Angle-to-Centerline 41 is a vessel simulation suitably driven by a synchro motor. Interfacing from CPU 18 requires a digital-to-synchro converter. Set Switches 46 and 47 can be made up of two-position switches for setting data in binary form, but decimal thumbwheel switches have been used with binary conversion logic at the output.

Figure 3:
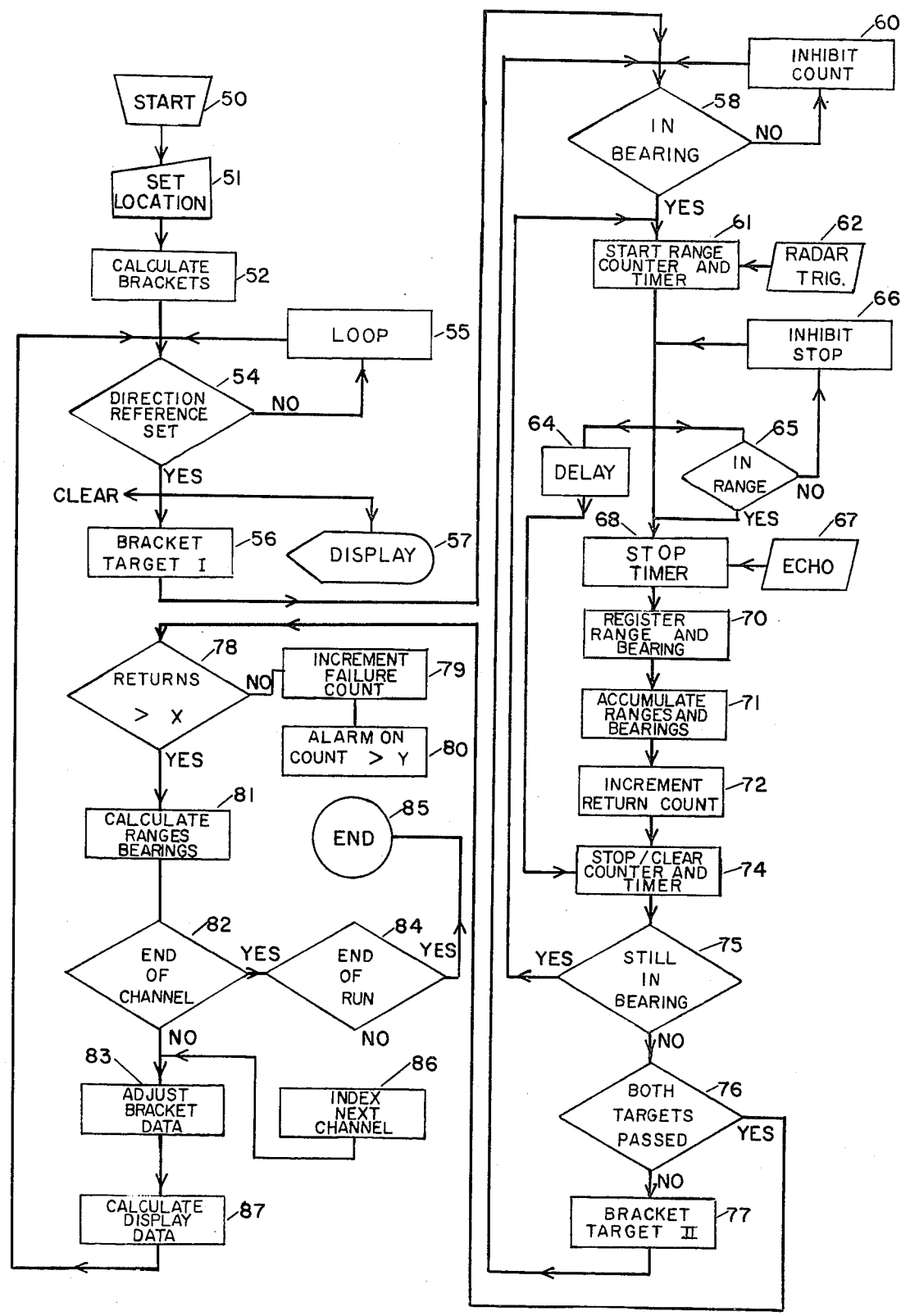
FIG. 3 is a data processing flow chart for the apparatus of FIG. 1.
Figure 4:
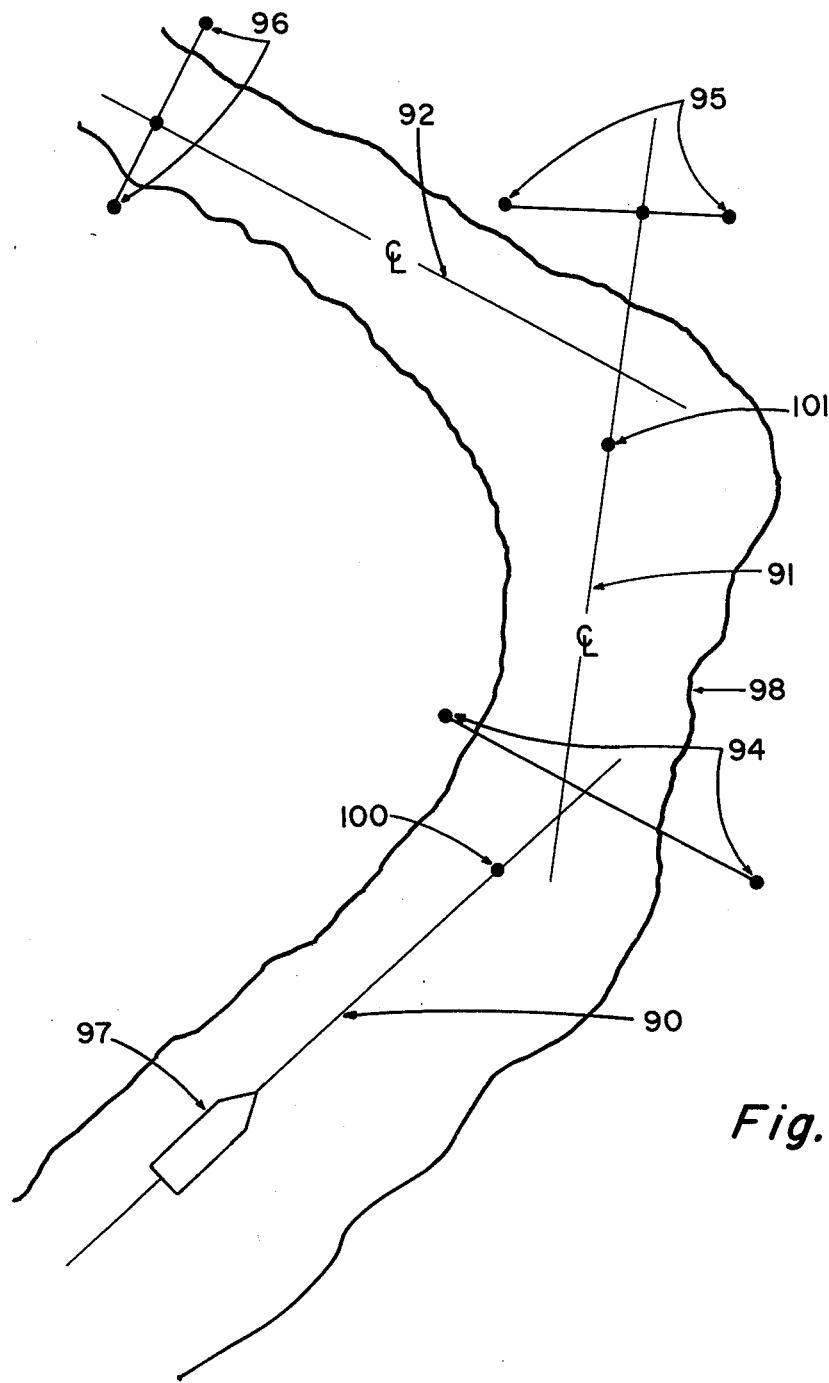
FIG. 4 is a diagram of a section of waterway showing reflectors and a boat carrying position locating apparatus.

Operation is best understood by reference to the Flow Chart of FIG. 3 and the waterway situation as depicted in FIG. 4.

FIG. 3 is a flow chart of the processing steps of the present invention. Start 50 is initial steps such as applying electrical power. The next step is Set Location 51 involving setting in the correct channel and rough range via the switches provided therefore on the display console. Calculate Brackets 52 is then performed by CPU 18 calculating bearing and range brackets on the basis of the information manually set in. Following completion of bracket calculations, CPU 18 interrogates for Direction Reference Set 54. The interrogation is repeated through Loop 55 until the reference set is encountered. The reference set is suitably a ship-relative marker such as a heading or stern marker and occurs when the radar antenna passes the reference. In FIG. 1 the reference set is communicated to CPU 18 from Bearing Register 20. A stern marker has been used for the reference set and starts a timing interval in CPU 18. The timing interval is a single rotation of the antenna and when the next reference set is encountered the data collected is displayed on Display 57.

At the beginning of the timing interval, CPU 18 places bearing and range brackets in Registers 26 and 27 as indicated by flow step 56, Bracket Target I. As the antenna rotates, Comparator 21 compares antenna bearing register 20 with Bearing Brackets Register 26. The flow step is In Bearing 58 decision. As long as the decision is NO, Inhibit Count 60 is provided in the form of an inhibit signal from Comparator 21 to Start Logic 31. As soon as the antenna comes within the bearing brackets, Start Range Counter & Timer 61 commences on the next Radar Trigger 62. This starts Range Counter 35 and Interval Timer 24. Delay 64 commences and a decision of In Range 65 is made. As long as the decision is NO, Range Comparator 34 provides Inhibit Stop 66. Inhibit Stop 66 prevents an incorrect radar echo or extraneous noise from stopping Interval Timer 24. Upon an In Range YES decision, the next Echo 67 stops Interval Timer 24 at Stop Timer step 68.

CPU 18 internally registers the count of Interval Timer 24 and the antenna bearing at the stop timer instant in Register Range and Bearing 70. These values are added to accumulation registers in step Accumulate Ranges and Bearings 71. Also in CPU 18, Increment Return Count 72 is incremented for each accumulation step. Stop/Clear Counter and Timer 74 is performed after Delay 64 whether an echo has already stopped Timer 24 or not. Still In Bearing decision 75 if YES, provides a loop back to Start Range Counter and Timer 61.

If decision is NO, Both Targets Passed decision 76 is made. If NO, Registers 26 and 27 are changed to Brackets for Target II. This is implemented by End Of Bearing input 37. The flow then loops back to In Bearing decision 58. If Both Targets Passed decision is YES, the next step is the decision, "are Returns Greater Than X? 78." During the time the radar antenna sweeps through the "in bearing" zone for a given target, a large number of radar pulses are transmitted. An arbitrary number "X" is selected as being the number of those pulses from which echos must have successfully yielded range interval times in order to calculate reliable bearing and range information. If the decision is NO then Increment Failure Count 79 is performed. Alarm On Count Greater Than Y 80 is visible and/or audible alarm that is energized when the failure count reaches an arbitrarily selected number Y within a fixed number of rotations of the radar antenna. When decision 78 is YES, then Calculate Ranges/Bearings 81 is an averaging of the accumulated data over a single rotation of the radar antenna. End Of Channel 82 is a decision. If the answer is NO, then Adjust Bracket Data 83 is performed in CPU 18. If the answer is YES, then END Of Run 84 is the next decision. If the end of run decision is yes, the sequence terminates at END 85.

If the end of run decision is NO, Index Next Channel 86 is performed. Position derived from the ranges and bearings at the end of channel decision together with the stored memory data for the next channel are used to calculate the new brackets at step 83. Following step 83, Calculate Display Data 87 is performed to provide data in the appropriate registers for driving the display. A loop from step 87 returns the flow to Direction Reference Set 54. As seen as the Direction Reference Set decision is YES, Display 57 activates the displays with the new data. At the same time, accumulating registers accumulating or incrementing only during a single antenna rotation are cleared and the brackets for Target I are registered in Registers 26 and 27. It will be noted that the various loops keep the sequence going until End 85 is eventually reached.

Operation of the alarm system does not stop operations, but only notifies the operator that the system is registering insufficient incoming data for correct results.

FIG. 4 depicts a section of waterway in which three chanels 90, 91 and 92 have been laid out. Channel 90 is defined by pair of reflectors 94, channel 91 by reflectors 95 and channel 92 by reflectors 96.

Vessel 97 following the waterway in channel 90 is approaching bend 98 in the waterway. Due to inertia, the helmsman must begin his turn earlier than the point where it is desired to have vessel 97 in next channel 91. How much earlier depends on the sharpness of the turn, the mass of vessel 97 and the speed of vessel 97.

While factors of speed and mass can be entered into a computer and the correct turning point calculated using memory data for sharpness of bend, present systems use predetermined turn points. These turn points are determined on an assumption of given speed and mass. The pilot or navigator must correct the turn points for different speeds or significant changes in mass due to loading. In FIG. 4 turn point 100 is the start of turn for changing from channel 90 to channel 91. Similarly turn point 101 is the start of turn for changing from channel 91 to channel 92. These turn points are calculated so that vessel 97 will follow reasonably close to the channel centerlines at the transition between channels. Thus the data displayed indicating distance from centerline and angle to centerline will continue to hold. The actual switch of channels in the navigation system is set to take place at the intersection of the two channels.

Buoy tenders equipped with the present navigation system can have special channel memories defining distance and angle to a buoy location. Alternatively, a buoy tender can use the same channel memories as used in navigating the waterway, but a layout can be prepared defining buoy locations by distance from turn, distance from centerline and angle to centerline.

Dredges operating in marked waterways for maintaining channel width and depth can utilize the same approach as the buoy tenders. For unmarked locations, a series of channels can be predetermined to cover the character of most dredging locations. At a new location, reflectors would be set up in accordance with the best adapted predetermined channel. The predetermined channels would all be available by memory.

While the invention has been described with relation to specific embodiments, obvious variations are contemplated and it is intended to cover the invention as set forth in the scope of the appended claims.

We claim:

1. On board navigational apparatus operative with radar reflectors located at fixed predetermined positions relative to channels of a waterway comprising:
   (a) a radar set consisting of a radar transmitter, radar receiver and a rotatable antenna;
   (b) a central processing unit;
   (c) a data processing memory connected to said processing unit and containing channel geometry data relative to radar reflectors at fixed positions;
   (d) manual control means connected to index said memory;
   (e) means to provide ship bearing information and means to provide antenna bearing information connected to said processing unit;
   (f) register means connected to said processing unit to register maximum and minimum bearing locations of one reflector of said reflectors as calculated by said processing unit;
   (g) register means connected to said processing unit to register maximum and minimum range locations of said one reflector as calculated by said processing unit;
   (h) interval timer means connected to said processing unit to time range intervals commencing with a trigger from said radar transmitter and providing an output to said processing unit;
   (i) start logic means connected between said radar transmitter and said interval timer enabling only radar triggers occurring between said minimum and maximum bearing locations to start said timer;
   (j) stop logic means connected between said radar receiver and said timer inhibiting stop of said timer on radar echoes received outside of said minimum and maximum range locations and both stopping said timer and transferring its contents to said central processing unit on an echo received inside said minimum an maximum range locations; and,
   (k) delay means connected between said start logic means and said interval timer for clearing said timer a predetermined delayed time interval after each start of said timer.

2. On board navigational apparatus according to claim 1 further comprising a bearing register registering antenna bearing and a comparator connected to both said bearing register and to said means to register bearing locations so as to provide signals indicative of when said antenna is directed within said bearing locations.

3. On board navigational apparatus according to claim 2 further comprising a range counter registering range after a trigger from said radar transmitter and a range comparator connected to both said range counter and to said means to register range locations so as to provide signals indicative of when radar echos are within said range locations.

4. On board navigational apparatus according to claim 3 further comprising a distance-from-centerline display register and a distance-from-turn display register connected to outputs from said central processing unit for displaying distance data computed by said processing unit.

* * * * *